Patented Mar. 21, 1950

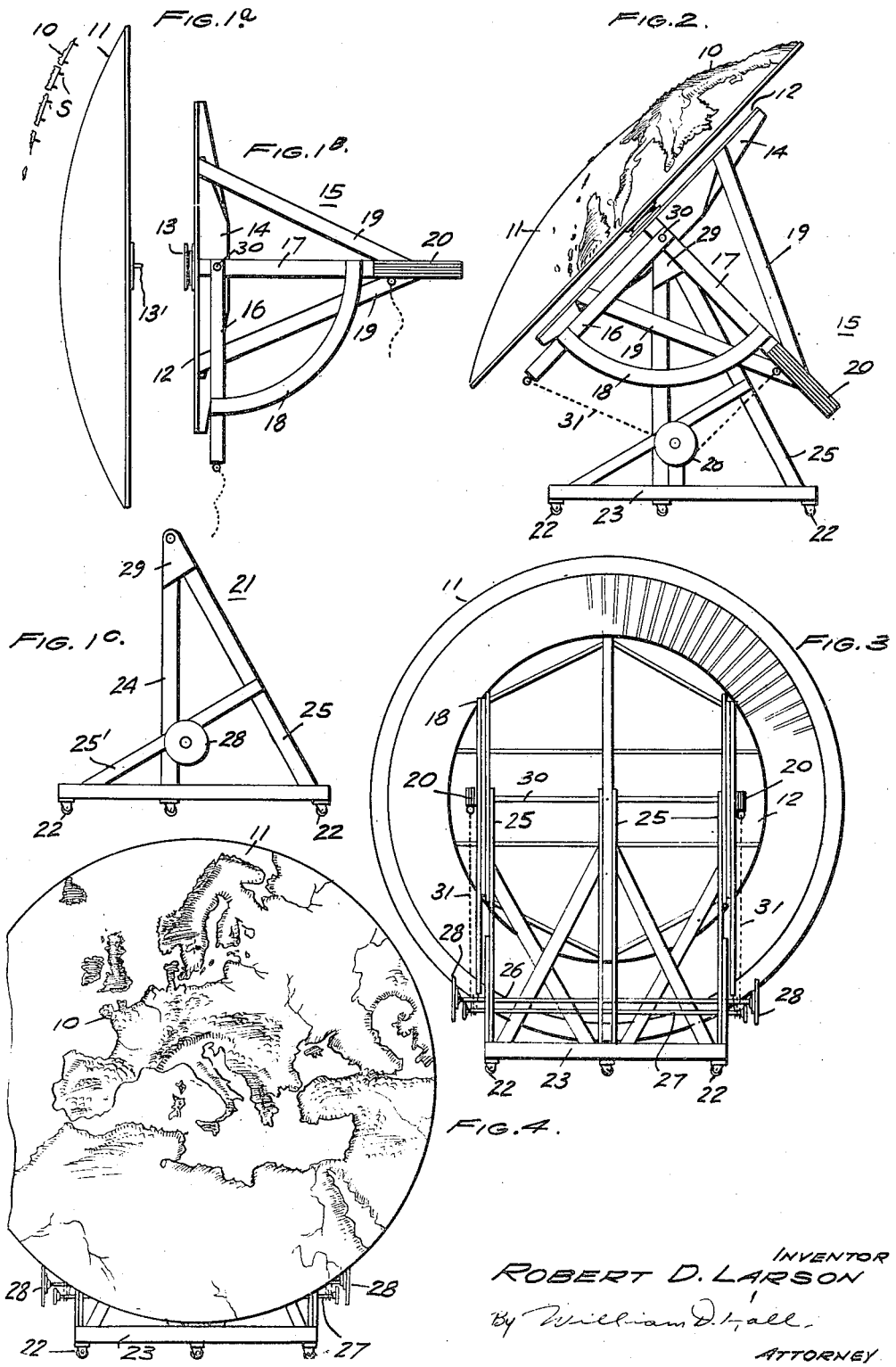

2,500,952

UNITED STATES PATENT OFFICE 2,500,952

MAP MOUNTING FOR AERIAL INSTRUCTIONS

Robert D. Larson, United States Army, New York, N. Y.

Application January 11, 1946, Serial No. 640,631

4 Claims. (Cl. 35—41)

(Granted under the act of March 3, 1883, as amended April 30, 1928; 370 O. G. 757)

The invention described herein may be manufactured and used by or for the Government for governmental purposes, without the payment to me of any royalty thereon.

This invention relates in general to large scale relief maps of the type that show the earth's curvature as well as the relief of terrain in the land areas, and more particularly to permanent devices for mounting such maps so that they may be displayed or photographed in any desired position. The principal use for the apparatus is in training aviators to recognize the various land areas of the earth as they are approached by air, and from various angles. The photographing of the map is incidental to such instruction, the photographs being issued to aviators to carry with them, and to schools for inspection by pupils, and may be supplementary to visual inspection of the map from required angles by an aviator seated in a fixed position, while the map is tilted and rotated to bring the areas of interest into positions corresponding to those at which the areas are likely to be observed on approach by airplane.

In the photography of relief maps for either commercial or educational purposes, it is desirable to have permanent maps which may be used for a variety of views. A complete globe of the earth in a large scale, modeled and finished with accurate detail, would serve well for this purpose, since from it one could make photographs of any part of the earth from any desired camera angle and from any desired distance. A globe would also be useful where it is desired to take motion picture panorama shots, in which either the globe itself or the camera is moved from one position to another. To build a globe to serve such a purpose would be impracticable because of the large size required for sufficient detail in relief, and more particularly because of the limitations involved in supporting and moving such a necessarily heavy and bulky object. For example, if a scale of 1:1,000,000 were desired, a complete globe of the earth would be approximately 40 feet in diameter and weigh several tons.

It is an object of my invention to provide a device that will include the most desirable features of a globe map and provide complete flexibility of movement by means of a practical and easily handled apparatus.

It is another object of my invention to provide a light-weight global segment, finished and coated to represent ocean areas on which may be mounted detachable sections of any desired land areas in relief and which segment may be revolved, tilted, or moved to any desired position.

The above and other objects and advantages will become readily apparent when the following specification is read in conjunction with the accompanying drawings, in which:

Fig. 1A represents a partially exploded side view of a portion of my invention.

Figs. 1B and 1C are a side view of the supporting frameworks of the global segment.

Fig. 2 is a side view of one embodiment of my invention.

Fig. 3 is a rear view of the device shown in Fig. 2.

Fig. 4 is a front view of the device shown in Fig. 2.

Referring to Fig. 1A of the drawings, it is seen that the reference numeral 10 represents typical sections of land areas, modeled in appropriate relief and having a radius of curvature substantially identical to that of global segment 11 upon which the land area sections 10 are to be fastened. The sections 10 are fastened to the global segment 11 by means of fasteners S or other means in a temporary manner so that they may be rigidly held in place but yet easily removed when it is desired to affix different land areas upon the global section 11.

The land sections 10 may be modeled in any of the usual ways for making relief maps. For example, laminations of cardboard or wood may be cut out to represent the corresponding contour lines, or if desired, clay may be modeled or cast to represent the desired land areas. However, the land sections must be built up upon a base which has a radius of curvature substantially the same as that of the global segment 11. In one method, a plaster block covered with heavy cardboard is covered with a sheet of wax paper to prevent the plaster, shellac and paint from adhering to the block. The cutout laminations are then soaked in paste and laid over the block and fastened thereto with pins until dry. When dry, the assembled laminations are covered with plaster and modeled in the usual manner and finally painted. A few holes are drilled in convenient places to receive the fastening means S such as screws or bolts to fasten the sections 10 to the global segment 11. Whne complete, the finished sections come off the plaster block easily because of the wax paper separation. The sections 10 may be made in any convenient size. In the case of very small islands or land areas having very little built up relief areas, the necessary relief may be built up and modeled directly upon the global segment 11 in such a way that it may be easily removed when desired.

The global segment 11 is preferably hollow and is constructed in a manner to give both rigidity and lightness of weight. For example, it may be constructed of laminated wood, Celotex, or any other light, rigid and flexible material. The surface used must be capable of receiving a smooth, painted finish to represent the ocean areas and of receiving fastening means such as screws or bolts used to fasten on the relief sections 10.

The global segment shown in the drawings represents 60° of the earth's perimeter. The segment may be made smaller or larger if desired. Obviously, the smaller the scale of the map, the larger the relative areas that could be portrayed and still remain within practical size. The use of a very large scale map would require the cutting down of the radius of the arc in order to remain practical in size.

The global segment 11 is supported upon a plate or platform 12 upon which is mounted a bearing 13. A stub shaft 13' is fixedly mounted on the inside center of the global segment 11 to coact with the bearing 13 so that the global segment 11 may be rotated about the axis of the stub shaft 13'. It will be seen that this affords a simple step bearing and that the segment 11 may be set in place or removed by translation axially so as to insert the stub shaft 13' in the bearing 13 or to withdraw it as the case may be. This enables assembly of various globe segments on the support framework as required, and also permits the setting of a segment with its chordal side resting upon a table or otherwise supported conveniently for preparation, revision, or replacement of surface configurations, while another segment is being photographed. The plate or platform 12 is strengthened by means of a plurality of reinforcing members 14 and is rigidly supported by a framework 15.

The framework 15 comprises two members 16 which are located in a plane parallel to the plate or platform 12, two rearwardly extending members 17 at right angles to the plane of the platform 12, and two curved members 18 which are utilized to stiffen the framework by connecting the members 16 and 17. In a like manner, a plurality of straight members 19 extend rearwardly from the back of the plate 12 to the rear end of the reinforcing members 17. A counterweight 20 is affixed to the outer end of each of the reinforcing members 17 for a purpose to be described later.

The reinforcing framework 15 is supported by a structure 21 which rests upon casters 22 so that the entire device may be moved from one position to another as desired. The structure 21 is made up of a plurality of horizontal members 23 upon which the casters 22 are mounted. A plurality of vertical members 24 are stiffened by a plurality of inclined members 25 which are in turn strengthened by the members 25' as seen in Figure 1C.

A shaft 26 having a handwheel 28 is rotatably mounted transversely of the supporting framework 21 in such manner that it is situated directly above a second shaft 27 which is suspended in a manner to be described later. At the juncture of the vertical member 24 and the transverse member 25 a reinforcing plate 29 is provided with an opening therethrough to receive a horizontal shaft 30, the purpose of which is to rotatably support the reinforcing framework 15 and the global segment 11.

In order that the global segment 11 may remain in position when it is tilted or rotated about the shaft 30, one end of a rope or cable 31 is connected to the counterweight 20 and the other end secured to the lower end of the vertical member 16. Two such ropes or cables are used, one on each side of the reinforcing network 15, and they are wrapped around the shaft 26 when the device is fully assembled. The lower shaft 27 hangs free and is used as an idler to take up the slack in the rope or cable 31.

By virtue of the construction just described, it is seen that by mounting the framework 15 upon the axle 10 it is possible to tilt and maintain the global segment 11 to any desired angle with the horizontal. This may be done by rotating the handwheel 28 on the axle 26. The counterweights 20 will act to hold the global segment at any angular position to which it is tilted. The global segment 11 may be rotated about the axis of the stub shaft 13' so that the map may be placed in any desired position with relation to the camera. Also, since the entire device is mounted on casters 22, it is possible to turn or shift the entire device translatively in any direction to any desired position.

Although I have described and illustrated one embodiment of my invention, it is obvious that many changes in the details of construction of the device may be made without departing from the spirit and the scope of the invention as set forth in the appended claims.

I claim:

1. In a device for preparing photographic topographical views simulating the appearance of the earth at given localities as viewed from air craft at any approach angle, in combination, a base support, a framework tiltingly mounted thereon for rocking movement on a horizontal axis at the apex of said base support, means to yieldingly hold the framework at adjusted positions on said axis, a global segment consisting of a truncation of a globe, having a chordal plane defining the truncation, and a pivot support connection between the said framework and said segment constructed to support the segment for rotation on an axis substantially normal to the axis of tilting movement of the framework on said base.

2. The structure of claim 1 in which said support connection is a separable one.

3. The structure of claim 1 in which said framework includes a step bearing and said global segment includes a pintle insertable slidably in the bearing, said framework being constructed entirely at one side of a plane close to the bearing normal to the axis of said bearing clear of the chordal base of the segment, and clear of the path of translative movement of the segment along the axis of said bearing.

4. In a relief map display device for simulating by photographs land areas of the earth viewed from various heights and angles, in combination, a caster-wheeled base including an upstanding support having a vertical front side, a tiltable framework pivoted on the upstanding support for movement about a horizontal axis at the apex March 21, 1950  M. L. LIBMAN  2,500,953
MAGNETORESISTOR
Filed Sept. 24, 1948  2 Sheets-Sheet 1
Fig. 1.
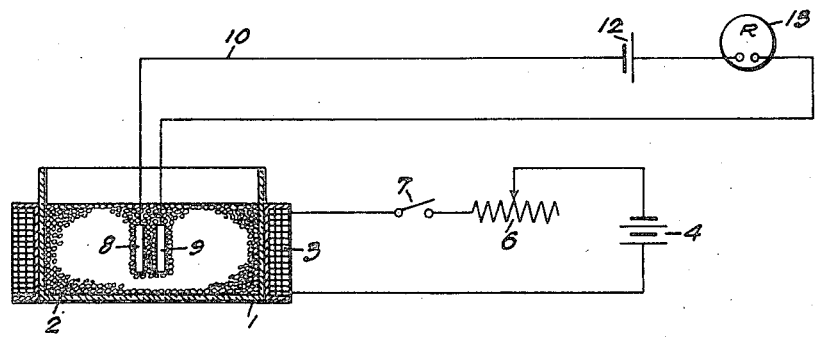
Fig. 2.
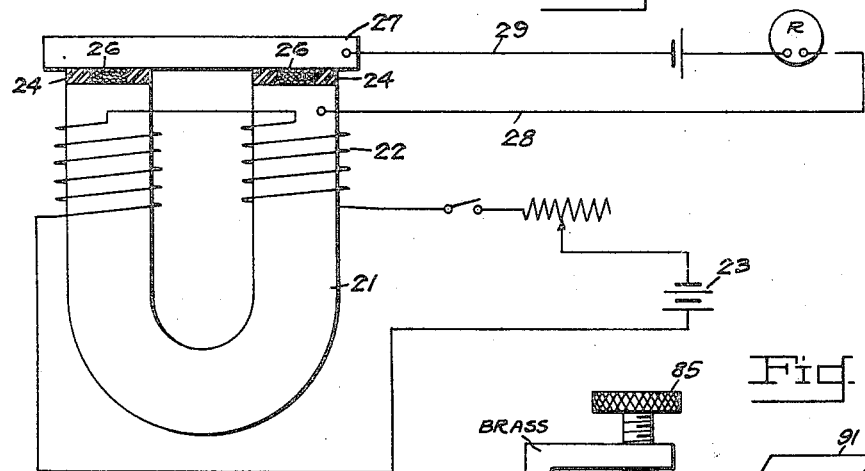
Fig. 3.
Fig. 4.
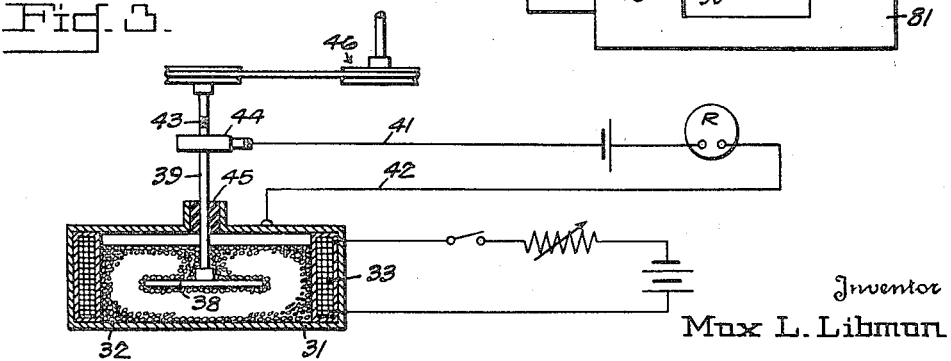
Inventor
Max L. Libman
By G. J. Kessenich & J. H. Church
Attorneys